Figures 1, 2:
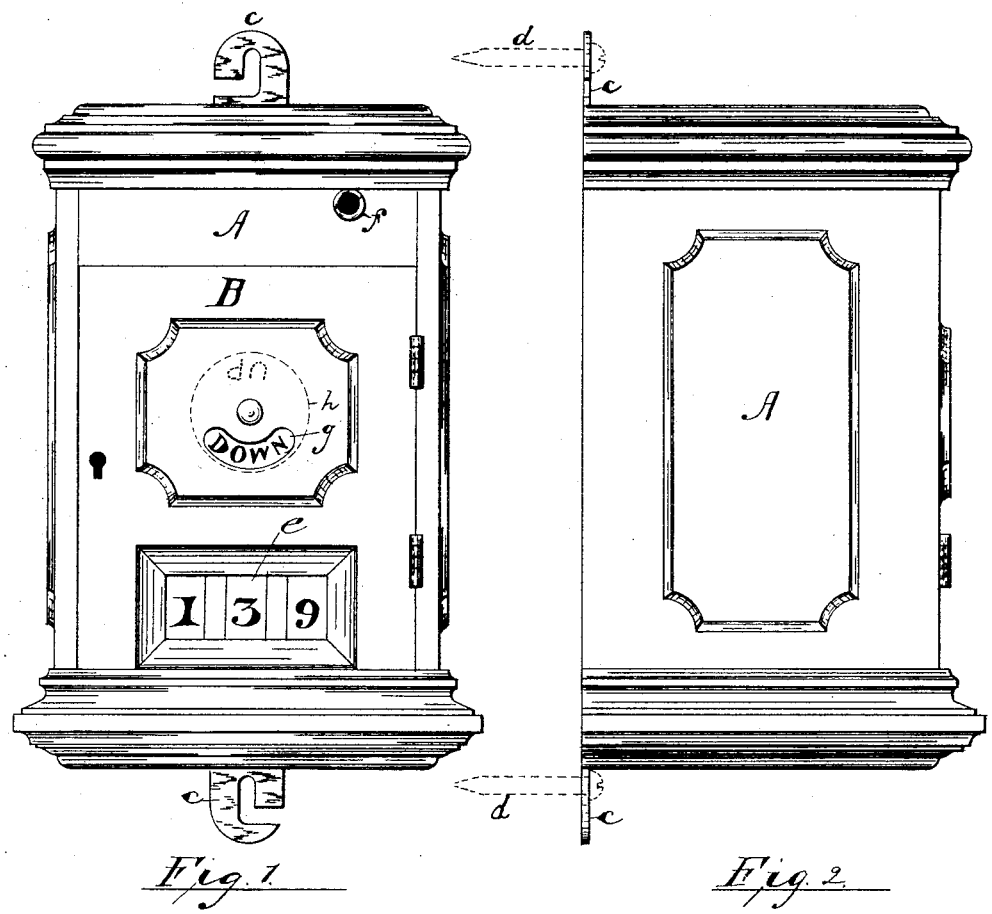

(No Model.) 6 Sheets—Sheet 1.

B. W. JEFFERY & G. F. GIERING.
FARE REGISTER.

No. 459,895. Patented Sept. 22, 1891.

WITNESSES: INVENTORS:
Oscar A. Michel Benjamin W. Jeffery AND
Chas. R. Michel George F. Giering,
BY Drake & Co. ATTY'S.

(No Model.) 6 Sheets—Sheet 2.

B. W. JEFFERY & G. F. GIERING.
FARE REGISTER.

No. 459,895. Patented Sept. 22, 1891.

Witnesses
Oscar A. Michel
Richard E. Powell

Inventors
Benjamin W. Jeffery,
George F. Giering.
By Drake & Co., Atty's.

(No Model.) 6 Sheets—Sheet 3.

B. W. JEFFERY & G. F. GIERING.
FARE REGISTER.

No. 459,895. Patented Sept. 22, 1891.

Witnesses
Oscar A. Michel
Richard E. Powell

Inventors
Benjamin W. Jeffery,
George F. Giering,
By Drake & Co. Atty's.

(No Model.) 6 Sheets—Sheet 4.
B. W. JEFFERY & G. F. GIERING.
FARE REGISTER.
No. 459,895. Patented Sept. 22, 1891.
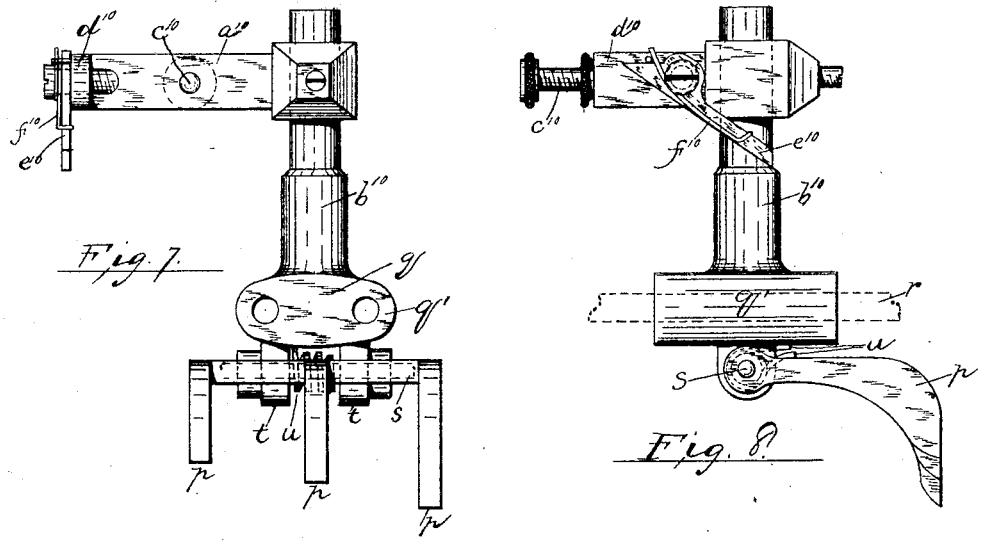
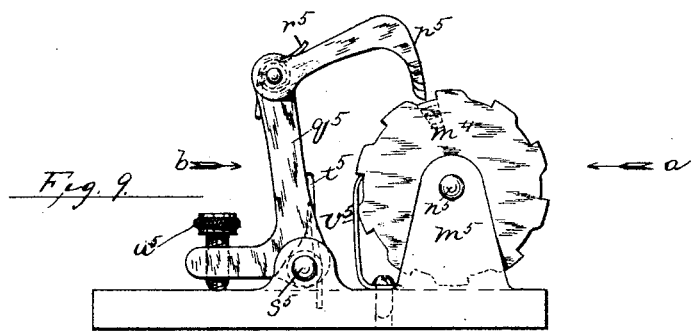
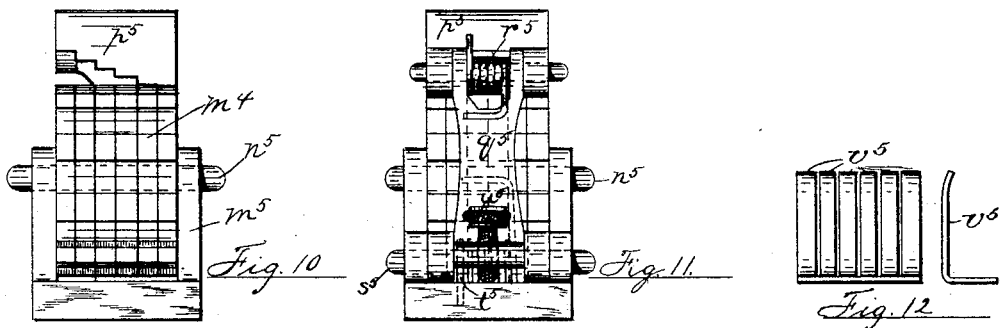
WITNESSES: INVENTORS:—
Oscar A. Michel. Benjamin W Jeffery
Chas. R. Michel. and George F Giering
 BY Draker Co. ATTY'S.

(No Model.) 6 Sheets—Sheet 5.

B. W. JEFFERY & G. F. GIERING.
FARE REGISTER.

No. 459,895. Patented Sept. 22, 1891.

WITNESSES:
Oscar A. Michel.
Chas. R. Michel.

INVENTORS:
BENJAMIN W. JEFFERY,
GEORGE F. GIERING.
BY Drake & Co. ATTY'S.

(No Model.) 6 Sheets—Sheet 6.

B. W. JEFFERY & G. F. GIERING.
FARE REGISTER.

No. 459,895. Patented Sept. 22, 1891.

Witnesses: Inventors:
Oscar A. Michel, Benjamin W. Jeffery,
Jno. Borras George F. Giering,
By Drake & Co. Atty's.

UNITED STATES PATENT OFFICE.

BENJAMIN W. JEFFERY, OF EAST ORANGE, AND GEORGE F. GIERING, OF NEWARK, ASSIGNOR OF ONE-HALF TO ALEXANDER MILNE, OF NEWARK, NEW JERSEY.

FARE-REGISTER.

SPECIFICATION forming part of Letters Patent No. 459,895, dated September 22, 1891.

Application filed May 3, 1890. Renewed August 19, 1891. Serial No. 403,094. (No model.)

*To all whom it may concern:*

Be it known that we, BENJAMIN W. JEFFERY and GEORGE F. GIERING, citizens of the United States, residing at East Orange and Newark, respectively, in the county of Essex and State of New Jersey, have invented certain new and useful Improvements in Fare-Registers; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

The objects of this invention are to provide a device that will be more certain and positive in its operations, one that will show on its open face or dial only the number corresponding with the fares taken and registered by the conductor, so that at a glance the number will be apparent; to secure greater compactness, so that the registering device will be less conspicuous and unsightly when in position in the car; to guard more effectually against peculation on the part of the conductor, to reduce the cost of construction, and to secure other results and advantages such as will be set forth in connection with the description of the invention.

The invention consists in the improved device for registering car-fares and for other purposes in the arrangements and combinations of parts thereof, substantially as will be hereinafter set forth, and finally embodied in the clauses of the claims.

Figure 4:
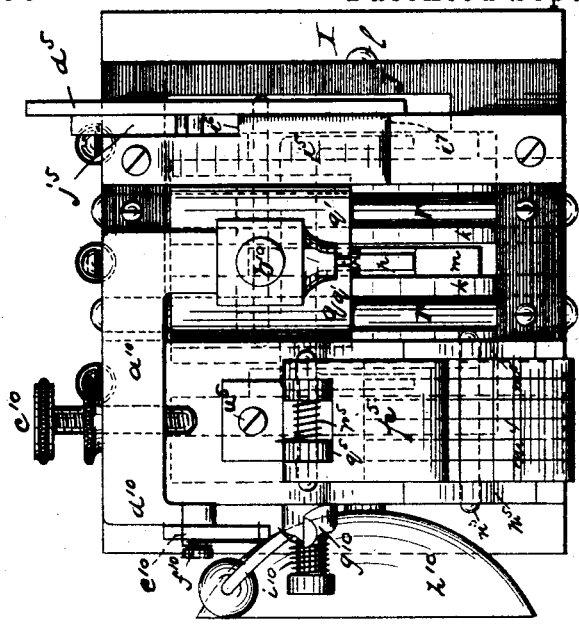
Figure 3:
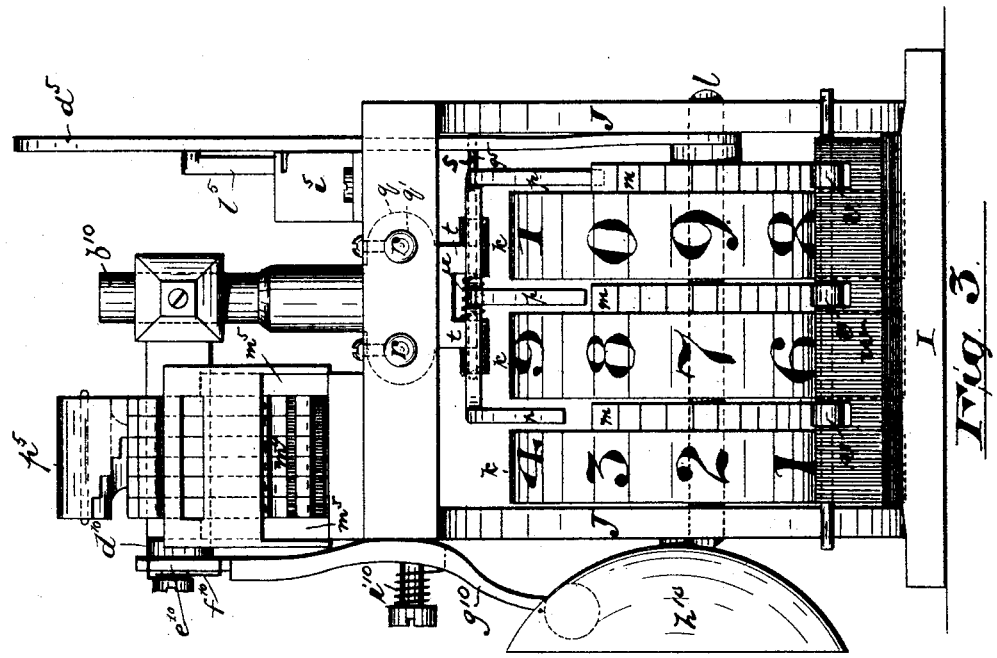
Figure 6:
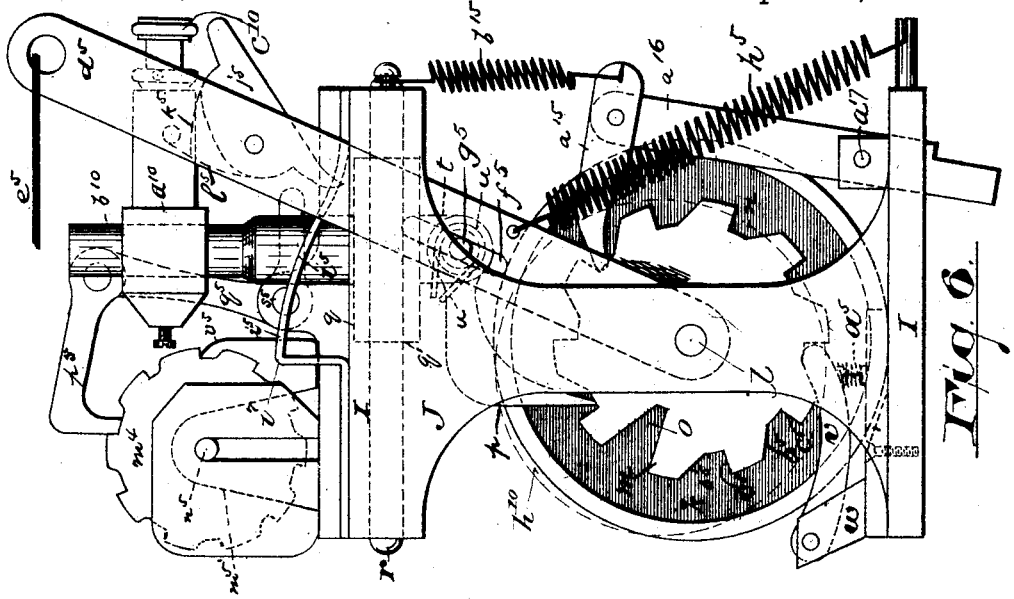
Figure 5:
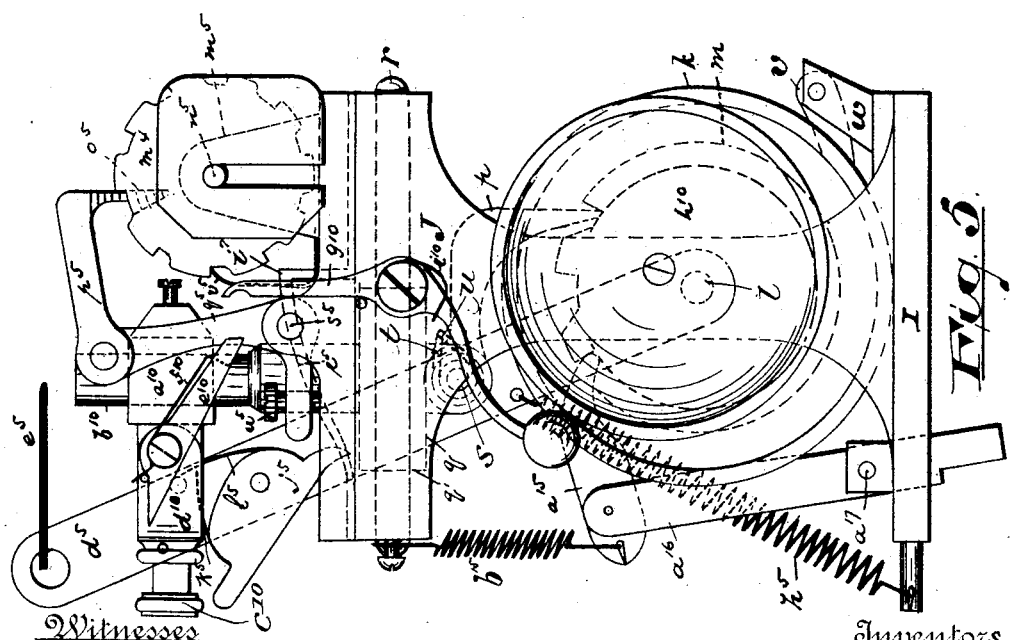
Figure 13:
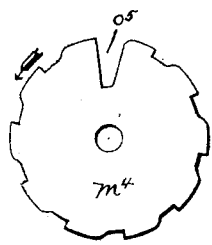
Figure 14:
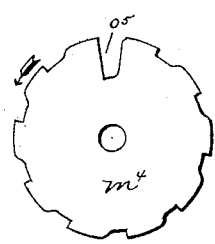
Figure 15:
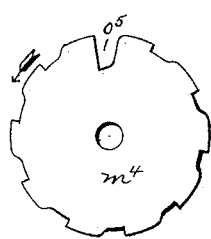
Figure 16:
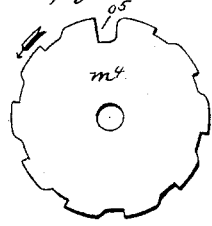
Figure 17:
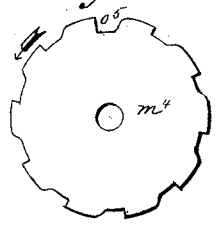
Figure 18:
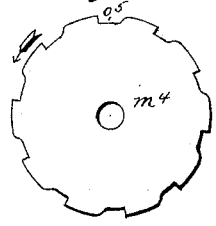
Figure 19:
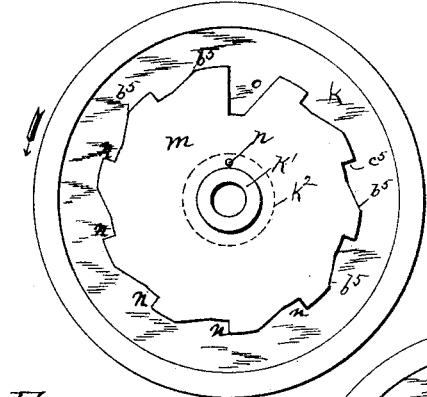
Figure 20:
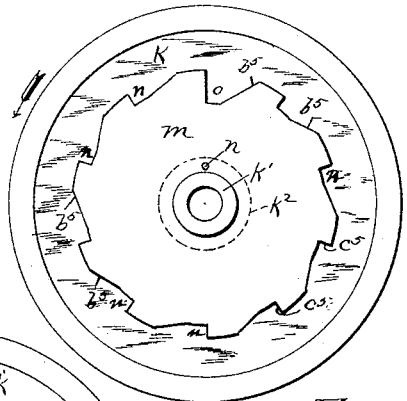
Figure 21:
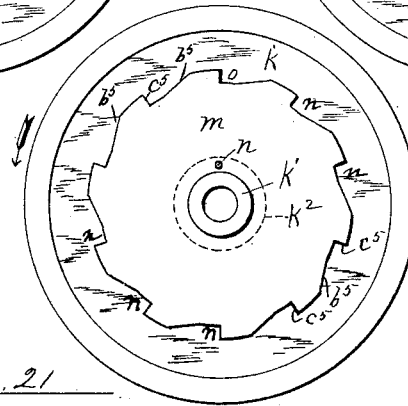
Figure 22:
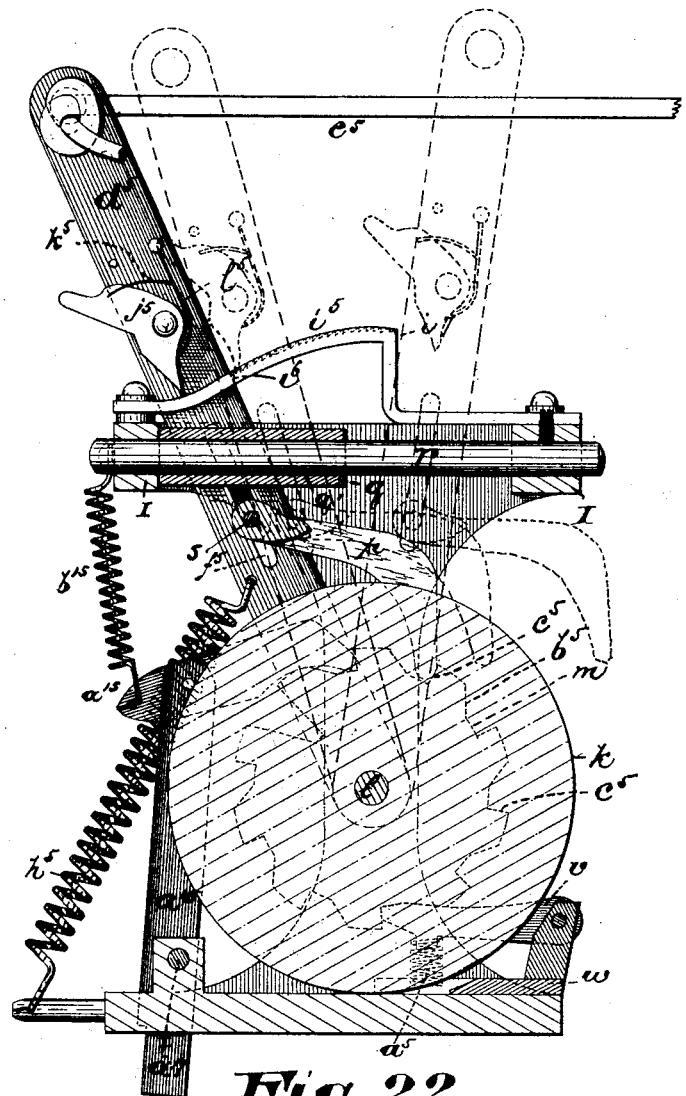
Figure 23:
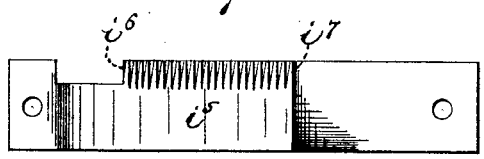

Referring to the accompanying drawings, in which like letters indicate corresponding parts in each of the several figures, Figure 1 is a front elevation of the improved register, and Fig. 2 is a side elevation of the same. Fig. 3 is a front elevation of the working mechanisms disconnected from the inclosing case or box. Fig. 4 is a plan of the same. Fig. 5 is an elevation taken from one side of the machine, and Fig. 6 is an elevation of the opposite side, and the remaining figures are detail views enlarged, Fig. 7 being a front elevation of a pawl-carriage for operating certain number disks or wheels; Fig. 8, a side view of the same; Fig. 9, a side view of a supplemental register or "tell-tale." Fig. 10 is a view taken in the direction of arrow $a$ on Fig. 9, and Fig. 11 is a view in the direction of arrow $b$. Fig. 12 discloses a front and side view of a spring-pawl for service in connection with the disks or wheels of the supplemental register. Figs. 13 to 18, inclusive, are detail views of the said disks or wheels of the supplemental register, showing certain graduated notches therein, and Figs. 19 to 21 are details of the number-wheels of the main register. Fig. 22 is a vertical section of the working mechanism to show more particularly the inner side of a lever adapted to be pulled or operated by the conductor to effect an operation of the registering mechanisms and co-operating parts for controlling the movements of said lever; and Fig. 23 is a plan of a certain segmental ratchet adapted to co-operate with a pawl on said lever, the ratchet-teeth being enlarged in proportion to the body of the ratchet to more fully illustrate the same.

In said drawings, A indicates a box or case adapted to be secured within the car or in any other situation, the said case being preferably of wood and provided with a door B and with catching-hooks $c$, extending from the opposite extremities of the box or case at the rear thereof, as shown in Fig. 2. The openings in said hooks face in opposite directions, as shown in Fig. 1, and thus the box will not be completely detached by a thrust or lateral blow in either direction and the box may be easily and quickly secured to or removed from the car or the screws or co-operating catches $d$ thereon. The said box or case is thus readily detachable from the car, so that the conductor may readily change the register from one car to another. The door is provided with a glazed opening $e$, through which the figures which indicate the number of fares taken may be readily seen. The said box is perforated, as at $f$, to allow the operating strap or cord $e^5$ by which the registering devices are actuated to pass from said devices outward to a point to be readily grasped by the conductor.

The door or other part of the device may be slotted, as at $g$, and be provided with a pivotal disk $h$ or a movable diaphragm on which the words "Down" and "Up" may be printed to indicate the direction of the trip, as will be understood.

Within the box is secured a metallic frame or bed-plate I, Figs. 3, 4, 5, and 6, providing standards J, between which a series or plurality of number wheels or disks $k$ are arranged. Said disks or wheels revolve on a shaft or arbor $l$ and are provided with wide peripheries, on which are painted or otherwise imposed or formed the figures by which the number of fares is indicated, the series of numbered disks $k$ comprising what is known as the "trip-register." Between said wheels $k$ are arranged ratchet-wheels $m$, which are rigidly secured to the hubs of said disk $k$ by means of pins $n$ or other suitable means, the said pins preferably passing through the sides of the ratchet-wheels into shoulders formed on said hubs, as will be clearly understood upon reference to Figs. 19, 20, and 21. The ratchet-wheels and number-disks may be connected, so as to move together in any other suitable manner. The ratchet-wheels have a series of graduated notches $o$, (shown in Figs. 19, 20, and 21,) adapted to receive a series of pushing-pawls $p$, Figs. 3, 7, and 8. Said pushing-pawls are arranged above the ratchet-wheel on a horizontal sliding carriage $q$, the said carriage being provided with bearings $q'$, which engage suitable tracks or ways $r$, formed on or secured to the bed-plate I.

The preferred method of forming said tracks or ways is the one illustrated, the tracks being round parallel rods suitably held in perforations through the upper portion of the frame or bed-plate, the bearings $q'$ being provided with round perforations closely corresponding to the diameter of the rods, so that the movement of the carriage will be firm on its bearings and have a steady and even movement thereon. The pawls $p$ are integrally connected or have a fixed relation to one another, and are pivoted on a bar or pin $s$, held in ears $t$, depending from the carriage $q$. When integrally connected the pawls $p$ are virtually a single graduated pawl or one provided with steps, as indicated in Figs. 7 and 8. The series of pawls somewhat resemble a fork, and are held against the ratchet-wheels or given a tendency to such an engagement by means of a spring $u$, which may be coiled around the pivotal pin $s$, as shown in Figs. 7 and 8, or be otherwise arranged to secure the desired result.

To prevent back motion of the number disks and ratchets, we have provided a series of pawls $v$. These are assembled on a carrier $w$ separable from the bed-plate, as shown in Fig. 6, and are held into engagement with the ratchet-wheels by springs $a^5$ interposed between said carrier and the ratchets, so that the upturned ends of the pawls are forced against the ratchet-wheels with considerable power.

The shape of the ratchet-teeth and of the co-operating pawls $v$ is such as that when the pushing-pawls $p$ force the wheels $k$ and ratchet-wheels $m$ beyond the desired position the force of the springs $a^5$ will cause the pawls to bear on the inclines $b^5$, Figs. 20 and 21, and give a slight return movement to the ratchet $m$ until the extremity of the pawl engages the bearing $c^5$, as will be understood. The sliding pawl-carriage $q$ is given a forward impulse, whereby the pawls are caused to revolve the number-disks by means of a lever $d^5$, which is fulcrumed preferably on the shaft $l$, on which the ratchet and number wheels are journaled. The opposite end of said lever receives the pulling or operating strap or cord $e^5$, Figs. 5 and 6, and at an intermediate point the said lever is slotted, as at $f^5$, and receives or engages a bearing $g^5$ of the pawl-carriage, said bearing being preferably the extremity of the rod $s$. A forward pull on the strap $e^5$ gives a corresponding movement to the lever $d^5$, pawl $p$, and ratchet-wheel $m$, and numbering-wheel $k$, as will be understood. A return movement is given to the lever by a spring $b^5$, having bearings on said lever and the machine bed-plate, as will be understood upon reference to Figs. 5 and 6.

To secure a certain correspondence between the registering-wheels $k$ of the trip-register whose numbers are exposed to public view and the numbers of the supplemental or total register which lies concealed within the case, access to which latter is obtained only by a superintendent of the railroad or other proper person having charge of the accounts, and to more effectually prevent improper manipulation of the device by which false registrations are or may be made, we have provided a stroke-regulator or a device adapted to prevent any back movement of the lever after the registering process has commenced until all said registering processes have been completed. To this end we have provided a fixed segment $i^5$, which is shown in side elevation in Fig. 6, in plan in Fig. 4, and an end view is shown in Fig. 3. This preferably consists of a strap-like piece of metal, which is bent, as shown in side elevation, one end being raised by a vertical leg above the frame or plate upon which said segment is fastened. At the ends the strap bears on said frame or plate and is made fast thereto in any suitable manner. On the upper curved face of said segment, at one edge thereof, are roughened surfaces resembling to some extent the surface of a file, the small teeth or projections of which engage or receive the tooth of the pawl $j^5$ under certain conditions to resist the back movement of the said pawl. The said ratcheted or roughened surfaces do not extend the full limit of movement of the tooth of the pawl; but at each end of the stroke thereof with the pivoted lever the said pawl is left free to drop from engagement with the ratchet, so that on a return or reverse movement the pawl will not enter into holding or staying relation to the pawl, as will be clearly understood. To allow the said pawl to free itself from the said segment at the end of the stroke the ratchet-surface terminates, as at $i^6$ and $i^7$ in Fig. 4, short of the limit of movement of the pawl in its curved course with the pivoted lever $d^5$. When the lever $d^5$ is pulled by the cord $e^5$ in the hands of the conductor when registering a fare and the pawl $j^5$ is started forward with said lever, the back of the catching-tooth thereof engages the shoulder $i^6$, Fig. 4, causing said pawl to turn pivotally, so as to slide over the ratched surface, being held, however, down onto said ratched surface by one of its springs, so that should a return movement be attempted short of a complete stroke and before a complete registration is effected such return movement would be prevented by the ratchet-tooth entering immediately into holding relation with the ratcheted surface. Without such an attempt to secure a premature return the ratchet is drawn to the opposite end of the segment, where it frees itself and one of the springs thereof operates to change the angle of inclination of the pawl slightly, so that on the return movement of the pawl and lever to their initial positions under the action of the spring $h^5$, Figs. 5 and 6, the opposite face of the tooth engages the bearing $i^7$ and changes the angle of the pawl still further, so that the biting extremity of the pawl will not hold, but slides freely to its said initial position without obstruction, as will be clearly understood. Springs $k^5$ $l^5$ are provided, the first to hold said pawl into holding engagement with the ratchet to prevent disengagement therefrom by slight jars or impulses of the lever and the latter to throw the pawl into position ready for its forward action.

To obtain greater security against improper manipulation on the part of the conductor or other person we have provided a supplemental or total register, already referred to, which we intend to have inclosed within the box or case and guarded by lock and key. This consists of a series of numbering-disks $m^4$, smaller than those heretofore described, arranged between ears $m^5$ of the frame or bed-plate on a shaft or pivot $n^5$. The peripheries of the numbering-disks $m^4$ are provided with ratchet-teeth and with graduated notches $o^5$ to receive a graduated or stepped pawl $p^5$. The pawl is carried by an adjustable arm $q^5$, Fig. 9, and is held into engagement with the ratcheted number-disks by a spring $r^5$. The adjustable arm $q^5$ of the trip-register is pivoted on the bed plate or frame on a pivot $s^5$ and is held in proper normal position by a spring $t^5$ and is adjusted by an adjusting-screw $u^5$, which is adapted to bring the graduated end of the pawl into proper operative engagement with the ratchet-teeth. The number-disks $m^4$ are held from revolving too rapidly under the impulse given by the pawl $p^5$ by means of a series of springs $v^5$, Figs. 9 and 12, or a single spring having a series of leaves, which engage the peripheries of the several disks, as will be understood. The said spring or springs also act as detents to prevent backward movement. The forward movement of the pawl $p^5$, by which the numbering-disks $m^4$ are turned, is secured by means of an arm $a^{10}$, adjustably held on a standard or post $b^{10}$ of the carriage $q$, the said arm $a^{10}$ being movable with said carriage under the impulse given by the lever and cord. The lever $d^5$ is connected to the carriage $q$ or is brought into operative relation thereto by the pivotal pin $s$, on which the pawls $p$ are centered, extending laterally, as shown in Figs. 3 and 6, into a slot $f^5$, Fig. 6, of said lever, so that when said lever is moved forward by draft on the cord the carriage having said pin is forced forward on its ways or tracks $r$, as will be understood. The said arm $a^{10}$ carries an adjustable bearing-screw $c^{10}$, which engages the back of the arm $q^5$ at a point in the direction indicated by the arrow $b$ in Fig. 9, the stroke being regulated and controlled by the several adjusting-screws. The arm $a^{10}$ is preferably extended, as at $d^{10}$, which extension carries a pawl or trip $e^{10}$, controlled by a spring $f^{10}$, which pawl engages a bell-hammer lever $g^{10}$, and at the end of the stroke causes a bell $h^{10}$, Figs. 3, 4, and 5 to be rung to attract the attention of the passengers to the fact that the fare has been paid or registered. The bell-hammer lever may be controlled by a spring $i^{10}$.

In operating the device after a fare has been paid the conductor pulls on the strap $e^5$ and thus pulls forward the lever $d^5$. This in turn moves the carriage $q$ forward on its way $r$ and causes the forked pawl $p$ to turn the units-disk $k$, so that the number "1" is brought to view on the trip-register. The same movement of the lever and carriage causes the bearing-screw $c^{10}$ to engage the pivoted arm $q^5$ and cause the pawl $p^5$ to turn the units-disk $m^4$ of the supplemental register, and at the end of the stroke the bell is also rung, as before described. Repeated strokes of the pawl continue to turn the units-disk alone until the tenth stroke is reached, when the deeper notch $o$ allows the pawl to drop so that the second graduation thereof engages the tens-disk and turns the same. At the hundredth stroke the hundreds-disk is in like manner turned, and so on to infinity, or as long as there are disks provided to engage the strokes to be registered. In like manner the inclosed register-disks or total-register $m^4$ are turned and repeat the work of the exposed register, as will be understood.

It is oftentimes desirable to begin each trip of the car with a new series of numbering of the exposed or trip register, while the concealed or total register continues in its operations to sum up the entire number of fares collected. To enable the conductor or other person to set the exposed disks $k$ back to zero we have provided a series of pushing-pawls $a^{15}$ independent of those described and which are carried by levers $a^{16}$, which extend through openings in the bottom of the box or case A or are otherwise arranged so that the conductor or other official may by hand or by means of a special tool provided for the purpose operate the levers or turn the disks at pleasure, without, however, affecting the supplemental disks or permanent register. The pushing-pawls $a^{15}$ are held into engagement with the ratchets $m$ of the number-disks $k$ by suitable springs $b^{15}$, and the levers $a^{16}$ are fulcrumed, as at $a^{17}$, on the bed-plate on a pin or pivot in any suitable manner.

While we have described in many instances in positive terms the peculiar construction shown, we are fully aware that many changes in and substitutions for the mechanisms and constructions shown may be made, and we do not wish to be understood as limiting ourselves to the specific devices thus positively described.

Having thus described our invention, what we claim as new, and wish to secure by Letters Patent, is—

1. The improved fare-register herein described combining therein registering mechanisms and means for operating the same, a case or box to inclose said mechanisms, and hooks arranged at the rear of said box or case and having the lateral openings therein face in opposite directions, substantially as and for the purposes set forth.

2. In combination, in a fare-register, a series of peripherally-numbered disks $k$, ratchet-wheels working therewith, a carriage $q$, carrying graduated pawls $p$, a lever $d$, engaging said carriage and giving movement thereto when operated by the conductor, and a regulator operating in connection with said lever whereby the latter, after having been started in its operative course, is prevented from returning before a full operative stroke is effected, substantially as set forth.

3. In a fare-register, a series of registering-disks $k$, ratchet-wheels $m$, a carriage $q$, graduated pawls $p$, a lever for operating said carriage, and a hand-strap for operating said lever, substantially as set forth.

4. In combination, in a fare-register, a series of numbering-disks arranged on a bed on a frame or bed-plate, a series of ratchet-wheels movable therewith, a series of pawls engaging said wheels and arranged on a sliding carriage, said carriage, a lever operating said carriage, a pawl for preventing back movement arranged on said lever, and a stationary segment having a roughened surface and arranged to engage said pawl as it moves with said lever, substantially as set forth.

5. In a registering device, the combination of two series of numbering-disks, a carriage having two sets of pawls, and means for operating said carriage and operating the two sets of pawls and two series of numbering-disks simultaneously, substantially as and for the purposes set forth.

6. In a registering device, in combination with the bed-plate or frame having tracks or ways $r\ r$, a carriage $q$ sliding thereon, means for operating said carriage, pawls $p$, pivoted on a pin $s$, held in ears $t$, depending from said carriage, a series of ratchet-wheels engaged by said pawls, a spring $u$, and a series of disks having numbered peripheries in connection with said ratchet-wheels, pawls $v$ for preventing back movement of said ratchet-wheels, and a pawl $a^{15}$, arranged in connection with a lever to enable an operator to turn said ratchet-wheels and numbered peripheries to a point indicative of zero without operating said carriage, substantially as and for the purposes set forth.

7. In a registering device, in combination with the bed-plate or frame having a sliding-pawl carriage and means for operating the same, pawls arranged on said carriage, and ratchet-wheels operating numbering-disks, a handled lever extending outside of or beyond the bed-plate or frame, and a pawl carried by said lever and engaging said ratchet-wheel and adapted to turn the same to zero without operating said carriage, substantially as and for the purposes set forth.

8. In combination in a registering device, with the bed-plate or frame inclosed in a box A, a carriage sliding on bearings of said frame, a total-register operated by said carriage, trip-registering pawls arranged on bearings of said carriage, ratchets operating the trip-registering disks, and a lever engaging said ratchets extending outside of said box and adapted to turn the ratchets and disks of the trip-register without affecting the said carriage or the total-register operated thereby.

9. In a registering device, the combination, with a total-register and a bell having a hammer, of a carriage carrying means for operating said bell and said total-register, and carrying means for operating the ratchet-wheels of the trip-register, said ratchet-wheels and trip-register, and a lever for turning the trip-register to zero without affecting the carriage, substantially as and for the purposes set forth.

10. In combination in a registering device, with the numbered wheels or disks $k$ and ratchet-wheels $m$, having inclines $b^5$ and stop-bearings $c^5$, of pawls $p$, a sliding carriage, a lever for operating said carriage, pawls $v$, spring $a^5$, a pawl $a^{15}$, and lever $a^{16}$, all said parts being arranged and operating substantially as set forth.

11. In a fare-register, the combination, with the number-disks $k$, ratchet-wheels $m$, pawls $p$, carriage $q$, lever $d^5$, engaging said carriage, rack or roughened strap $i^5$, pawl $j^5$, secured to said lever, and springs controlling said pawl, and a spring $h^5$ for the lever $d^5$, all arranged and combined substantially as and for the purposes set forth.

12. In combination with the number-disks $k\ k\ k$, having numbers on the peripheries thereof, ratchet-wheels $m\ m\ m$, pawls $p\ p\ p$, supported by a sliding carriage, a lever operating said sliding carriage, an independent lever, and pawls $a^{15} a^{16}$, engaging said ratchet-wheels $a^5$, and stop-pawls $v$ and springs $m$, all arranged substantially as and for the purposes set forth.

13. In combination with the frame or bed I, having a series of number-disks $m^4$, with numbers on the peripheral faces thereof and notches therein, of a stepped pawl $p^5$, pivoted on an arm $q^5$, pivoted, as at $s^5$, to said frame or bed, and a sliding carriage provided with an arm, arm $a^{10}$, adapted to engage said pivoted arm $q^5$, substantially as and for the purposes set forth.

14. In a fare-register with a bell-lever and bell, a series of registering-disks $m^4$, a pawl $p^5$, pivoted on a pivoted arm, a sliding carriage having an arm $a^{10}$, and a lever for operating said carriage, bell-lever, and pawl simultaneously, substantially as set forth.

In testimony that we claim the foregoing we have hereunto set our hands this 12th day of April, 1890.

BENJAMIN W. JEFFERY.
GEORGE F. GIERING.

Witnesses:
OLIVER DRAKE,
OSCAR A. MICHEL.